United States Patent [19]

Nelson

[11] Patent Number: 4,598,206
[45] Date of Patent: Jul. 1, 1986

[54] INFRARED RADIATION REFERENCE

[75] Inventor: Robert E. Nelson, Weston, Mass.

[73] Assignee: The Gillette Company, Boston, Mass.

[21] Appl. No.: 511,315

[22] Filed: Jul. 6, 1983

[51] Int. Cl.$^4$ .............................................. G01J 1/00
[52] U.S. Cl. .............................. 250/495.1; 250/494.1
[58] Field of Search ............... 250/493.1, 494.1, 495.1, 250/504 R, 505.1; 219/553, 354

[56] References Cited

U.S. PATENT DOCUMENTS

| | | |
|---|---|---|
| 2,667,806 | 2/1954 | Gier et al. . |
| 3,080,483 | 3/1963 | Jaffe et al. . |
| 3,138,697 | 6/1964 | Banca et al. . |
| 3,205,343 | 9/1965 | De Bell et al. . |
| 3,211,910 | 10/1965 | Anderson . |
| 3,275,829 | 9/1966 | McClune et al. . |
| 3,309,881 | 3/1967 | Beerman . |
| 3,316,405 | 4/1967 | Astheimer . |
| 3,327,093 | 6/1967 | Hager et al. ........................ 219/354 |
| 3,394,259 | 7/1968 | Brown . |
| 3,419,709 | 12/1968 | De Bell . |
| 3,487,217 | 12/1969 | Cussen . |
| 3,525,850 | 8/1970 | Hager ................................. 219/553 |
| 3,536,919 | 10/1970 | Newman . |
| 3,539,811 | 11/1970 | Risgin . |
| 3,585,390 | 6/1971 | Ishikawa . |
| 3,597,618 | 8/1971 | Jordan et al. ..................... 250/495.1 |
| 3,699,343 | 10/1972 | Stein et al. . |
| 3,751,303 | 8/1973 | Kittl . |
| 4,084,096 | 4/1978 | Edwards .......................... 250/493.1 |
| 4,103,174 | 7/1978 | McClatchie et al. . |
| 4,184,066 | 1/1980 | Svoboda .......................... 250/493.1 |
| 4,197,466 | 4/1980 | Hug . |
| 4,262,190 | 4/1981 | Hager ................................. 219/354 |
| 4,317,042 | 2/1982 | Bartell . |
| 4,412,126 | 8/1983 | Brockway ......................... 219/553 |
| 4,445,026 | 4/1984 | Walker .............................. 219/553 |
| 4,486,652 | 12/1984 | Muka ............................... 250/493.1 |

OTHER PUBLICATIONS

Physical Optics, by Robert W. Wood, 3rd edition 1934 copyright, pp. 778-781.
W. I. Wolfe & G. J. Zissis, Eds., "The Infrared Handbook," The Infrared Information and Analysis (IRIA) Center, Environmental Research Institute of Michigan, 1978, Chapter 2.
E. W. Trevenfels, "Emissivity of Isothermal Cavities," JOSA, vol. 53, No. 10, Oct., 1963, pp. 1162-1171.
J. C. De Vos, "Evaluation of the Quality of a Blackbody," Physica, vol. XX, pp. 669-689.

Primary Examiner—Bruce C. Anderson
Attorney, Agent, or Firm—Raymond J. De Vellis

[57] ABSTRACT

A plurality of nestable members, such as razor blades, are formed into a stack having a parallel array of symmetrical, triangular-shaped edges. The stack of blades are maintained in a close abutting relationship and means are provided for controlling the temperature of the stack.

22 Claims, 3 Drawing Figures

INFRARED RADIATION REFERENCE

BACKGROUND OF THE INVENTION

This invention relates to black bodies or infrared radiation references.

More particularly, this invention relates to infrared radiation references formed of a plurality of discrete, thin, nestable members, preferably razor blades, which form part of an infrared radiation reference particularly suitable for calibration of certain instrumentation.

A black body is a radiator of uniform temperature whose radiant exitance in all parts of the spectrum is the maximum obtaining from any radiator at the same temperature. The black body is variously called a standard radiator or an ideal radiator.

The term black body denotes an ideal body which would, if it existed, absorb all and reflect none of the radiation falling upon it; its reflectivity would be zero and its absorptivity would be 100%. Such a body would, when illuminated, appear perfectly black and be invisible except as its outline might be revealed by the obscuring of objects beyond. The chief interest attached to such a body lies in the character of the radiation emitted by it when heated and the laws which govern the relations of the flux density and the spectral energy distribution of that radiation to the temperature.

The total emission of radiant energy from a black body takes place at a rate expressed by the Stefan-Boltzmann law, which states that the total electromagnetic emission of a black body is proportional to the fourth power of its absolute temperature; while its spectral energy distribution is described by Wien's laws, or more accurately by Planck's equation, as well as by a number of other empirical laws and formulae. Planck's formula indicates that a black body, which has a temperature between 50 Kelvin and 3000 Kelvin will emit electromagnetic radiation principally in the infrared region. This temperature range encompasses the temperatures at which most non-nuclear physical phenomena occur.

The nearest approach to the ideal black body, experimentally, is not a sooty surface, as might be supposed, but an almost completely closed cavity in an opaque body, such as a jug. The laboratory type is usually a somewhat elongated, hollow, metal cylinder, blackened inside, and completely closed except for a narrow slit in one end. When such an enclosure is heated, the radiation escaping through the opening closely resembles the ideal black body radiation; while light or other radiation entering by the opening is almost completely trapped by multiple reflection from the walls, so that the opening usually appears intensely black. For this reason, black body or "Planckian" radiation is also often called "cavity radiation."

Black bodies or infrared radiation references are necessary for the calibration of radiation pyrometers, satellite spectrometers, and have applications in the general area of radiation thermometry. Since accuracy is vital, the emissivity of these black body references must be known. Generally, a black body reference consists of some type of isothermal cavity or cavity array that is fabricated out of a relatively emissive material. With the appropriate cavity geometry and a sufficiently emissive cavity surface, the reference's emissivity will approach unity and, thus, be most useful because its calculated performance estimate is most correct. It must be emphasized that an accurate experimental determination of emissivity is not possible, and experimentors must rely on appropriate implementations of cavity structures that are amenable to analysis.

The most popular geometries for black body references are cones where the aperture dimension (open end diameter) is very much less than the axial length of the cone; or pierced spheres, where the aperture diameter is very much less than the sphere's diameter. These structures are generally large as compared with the aperture dimensions. Since the cavity surface must be isothermal in a precision reference, temperature controlling means and substantial amounts of thermal insulation add to the bulk of these laboratory references.

There is a class of more portable black body references that rely on highly emissive surfaces rather than large cavities. These surfaces may be an array of cylinders, honeycomb, pyramids, or other similar stuctures that facilitate multiple reflections. Not all of these geometric shapes have been treated analytically with respect to calculated emissivities, but they may be approximated by equivalent cylinders and cones to estimate emissivity in many cases. For a review of the state of the art of infrared references, see W. I. Wolfe and G. J. Zissis, Eds., "The Infrared Handbook", The Infrared Information and Analysis (IRIA) Center, Environmental Research Institute of Michigan, 1978, Chapter 2.

There is an emissive surface geometry, however, that is amenable to analysis. This is a parallel "V"-groove block as described in E. W. Treuenfels, "Emissivity of Isothermal Cavities", JOSA, Vol. 53, No. 10, October, 1963. pp. 1162–1171. Although relatively easy to analyze, the analysis assumes vanishingly small (actually zero) radii of curvature at the peaks and valleys of the triangular segments. Realistically, one cannot machine out of bulk metal a series of "V"-grooves with sufficiently sharp troughs and apexes. There will, in fact, be reflecting bands in the machined block at each trough and apex that reduce the emissivity (by virtue of the reflection) in an unpredictable (or non-analyzable) manner.

SUMMARY OF THE INVENTION

Briefly stated and according to an aspect of this invention, the problems associated with the prior art are overcome by stacking a plurality of discrete, thin, nestable members, each having a symmetrical, triangular-shaped edge. In a preferred embodiment, the thin members are razor blades, and the formed parallel array of razor blade edges provides an implementable "V"-groove structure that can be employed as a precision infrared reference because it approaches ideal geometry. Although present technology permits a radius of curvature of about 50 Angstrom units, the apex of a modern blade edge has a radius of curvature of about 200 Angstrom units. The trough or the region between two nested adjacent blades approaches a parallel wall slot of small width which is an ideal light trap. Consequently, an array of blade edges achieves the objective of a highly emissive (on axis) surface with predictable (known and stable) properties. The use of a black body made up of a stack of razor blades to form a parallel array of razor blade edges provides a black body especially applicable for use as part of an infrared radiation reference.

It is therefore an object of this invention to provide an improved black body for use in an infrared radiation reference.

It is a further object of this invention to provide a reproducable, easy-to-manufacture infrared radiation reference system which utilizes a stack of razor blades as a black body.

It is a further object of this invention to provide a precise infrared radiation reference.

BRIEF DESCRIPTION OF THE DRAWINGS

The invention both as to its organization and principles of operation, together with objects and advantages thereof, may be better understood by referring to the following detailed description of an embodiment of the invention taken in conjunction with the accompanying drawings in which.

DESCRIPTION OF A PREFERRED EMBODIMENT

Figure 1:
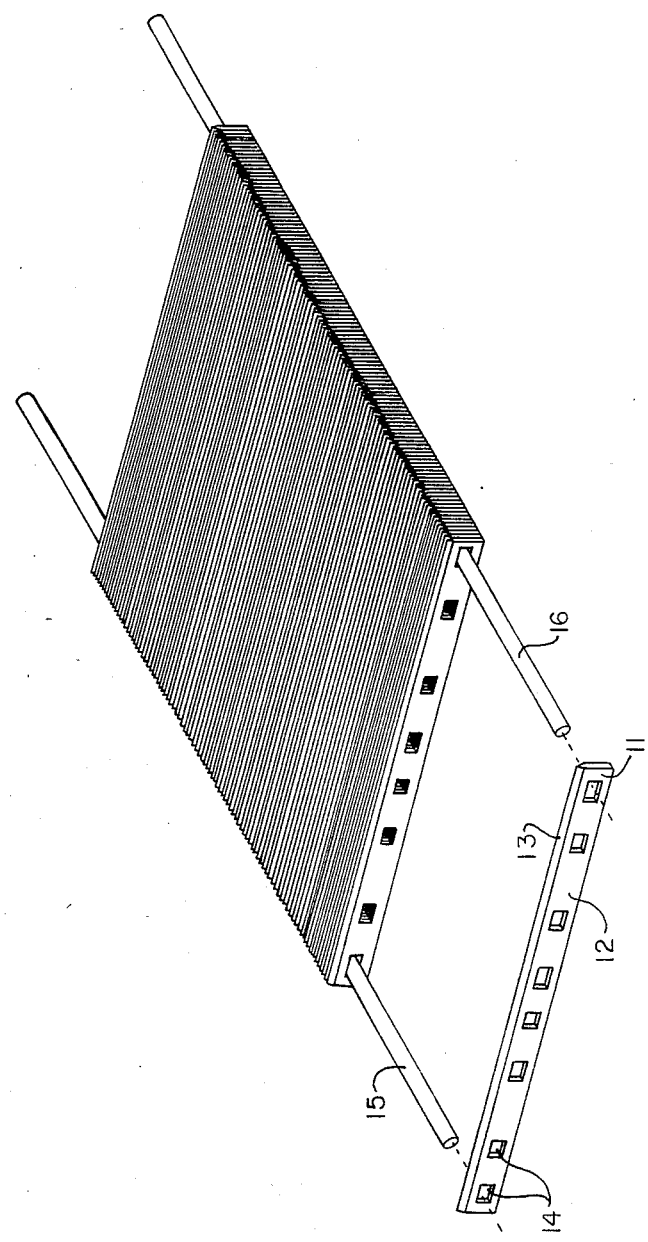
FIG. 1 is a perspective view of a plurality of sharpened razor blade stock members formed as a stack, in accordance with this invention.

Referring to FIG. 1, a plurality of thin, substantially planar members 11 are formed in alignment and in close abutting relationship with one another to form a stack of thin members. Each thin member 11 includes a planar base portion 12 and a wedge-shaped or symmetrical, triangular edge 13. When the thin members 11 are formed in the stack, the aligned stack has a parallel array of symmetrical, triangular edges.

Each thin member 11 includes a plurality of apertures or perforations 14. The perforations adjacent the sides of each thin member are used as a registration aid to align the thin members in a stack in cooperation with rods 15 and 16. Other stacking or nesting techniques, well known in the art, may be employed in the practice of this invention.

Preferably, the thin members 11 will be substantially planar in order to facilitate close abuttment of adjoining members 11. However, it is within the scope of this invention to have only a portion of each thin member 11 substantially planar in order to achieve a close abutting relationship. That is, a portion of the planar portion 12 of thin member 11 may be bent or the like, the important thing being the capability of stacking or nesting the thin members 11 in such a way that the region between the two adjacent members will approach a parallel wall slot of small width and act as an ideal light trap.

In a preferred embodiment, the thin members 11 are blade stock sharpened on one edge. Another form of a safety razor blade may also be utilized. Suitable safety razor blades are formed of steel and are typically in the range of from 0.0015 to about 0.009 inch thick and have a symmetrical triangular cutting edge, the included solid angle of which is preferably less than about 14° but may be in the range of from 14° to 35°. The faces or sides of such cutting edges may extend back from the edge for a distance of up to as much as 0.1 inch or even less. Each face need not be a singular planar uninterrupted continuous surface or "facet", but may consist of two or more "facets" formed by successive grinding or honing operations and intersecting each other along zones generally parallel to the ultimate edge. The final facet, i.e., the facet immediately adjacent the ultimate edge, may have a width as little as 0.0003 inch or even less, while the thickness of the ultimate edge itself is generally less than 6000 Angstrom units and preferably less than 2500 of which the blade and the blade edge Angstrom units. The steel of which the blade and the blade edge is composed may be either carbon steel or hardenable stainless steel. In either case, it is hardened by a suitable heat-treating process.

Preferably, in use in the practice of this invention, sharpened blade stock, or a razor blade, is fabricated from stainless steel and is oxidized to a relatively high emissivity. The oxidation of the blade, including the cutting edge, which is accomplished in any well known manner such as by heating the blade in air, causes a roughening of the cutting edge without a substantial decrease in the sharpness of the blade edge.

Although this invention is equally applicable to razor blades which have on their cutting edges a shave-facilitating coating such as adherent coating of a solid polymer of tetrafluoroethylene disclosed in U.S. Pat. No. 3,071,856, or the like, it is preferable to utilize a sharpened razor blade which has been oxidized without any shave-facilitating coating in the practice of this invention.

Modern razor blade stock, which is fabricated from stainless steel such as 440 martensitic, and which can be oxidized to a relatively high emissivity is generally available and suitable for practice of this invention. The surfaces of such razor blade stock are not only absorptive but also stable to temperatures up to 1000° C. in the appropriate gas environment.

Sharpened blade stock is generally available in long lengths in reel form. It is convenient to deal with dimensions in the direction parallel to the blade edge that are in increments of 1.5 inches, which is the standard length in a razor assembly. There are typically perforations, such as perforations 14, in the blade strip that facilitate its location in a typical plastic cartridge assembly. The perforations that exist in a razor blade are suitable for use as the registration aid in the stack assembly of FIG. 1. In FIG. 1, a stack of three-inch long thin members or blades 11 is supported on rods 15 and 16.

Figure 2:
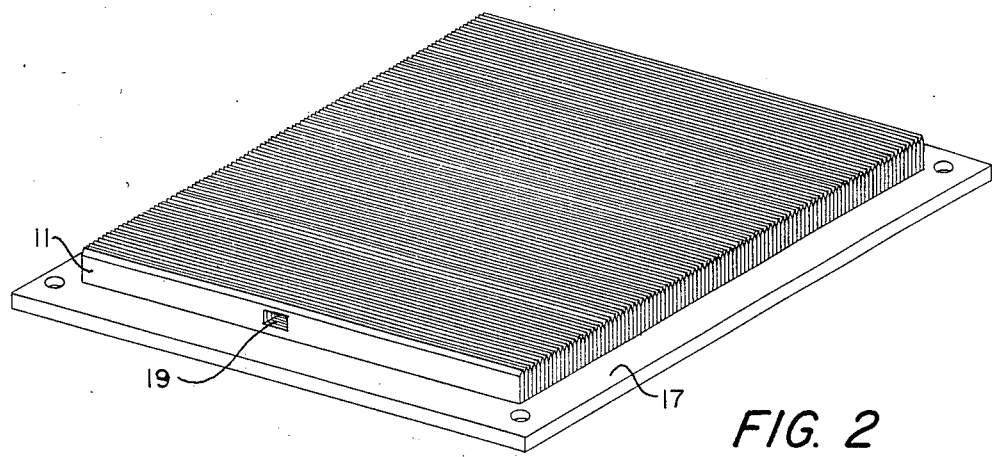
FIG. 2 is a perspective view of the stack of razor blades of FIG. 1 attached to a mounting plate, in accordance with this invention.

Referring to FIG. 2, the stack of razor blades 11 of FIG. 1 are compressed and attached to a mounting plate 17 which maintains the stack of razor blades in alignment and in close abutting relationship. The blunt edges of the blades 11, opposite the symmetrical triangular cutting edges, are attached to the front side of the mounting plate 17. The blades 11 may be epoxied, soldered, or brazed onto the mounting plate 17 depending on the operating temperature of the reference.

The mounting plate 17 is preferably fabricated from a high thermal conductivity material which has a coefficient of thermal expansion near that of stainless steel. The mounting plate 17 of FIG. 2 may be formed as a copper base plate. Once the blades 11 are attached to the mounting plate 17, the apertures or perforations 14 may be filled to increase the thermal conductivity of the assembly. FIG. 2 illustrates all the perforations 14 plugged, except for a generally centrally located perforation or hole 19.

As an alternative, the stack of thin members 11 can be formed without the use of registration aids in the form of holes through the planar portions of the thin members 11, and a hole such as hole 19 could be formed as a well which extends to the middle portion of the stack of razor blades. The purpose of the hole 19 is to receive temperature sensor means, such as temperature sensor 20 shown in FIG. 3. The temperature sensor means may be in the form of any well known sensor, or sensors, such as a thermocouple, platinum resistor, thermistor, etc.

Figure 3:
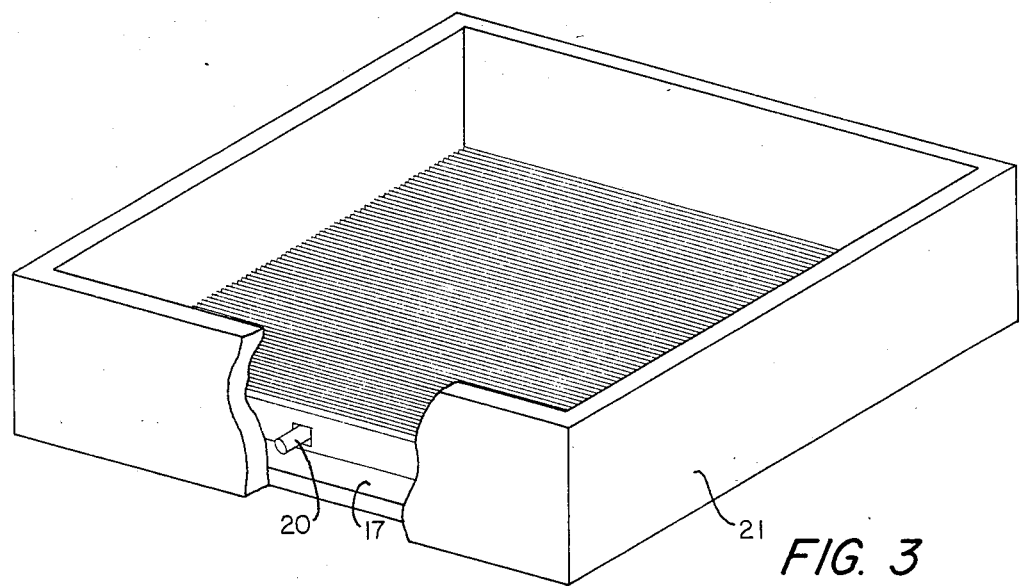
FIG. 3 is a perspective view of the stack of razor blades mounted on the mounting plate of FIG. 2 and including a temperature control and a baffle assembly, partially broken away, in accordance with this invention.

Referring to FIG. 3, a guard ring or baffle 21 is formed as a wall about the periphery of the mounting plate 17. The baffle 21 is attached to the mounting plate 17 in a manner compatible with the operating temperature of the reference. The temperature of baffle 21 is adjusted to be very near the reference temperature. Such a system will reduce the effect of edge gradients and increase temperature uniformity of the basic razor blade stack reference target.

Means for controlling the temperature of the stack of razor blades may be in the form of block resistors or a resistive winding attached to the back side of the copper mounting plate 17 and/or to each side of the baffle 21, to heat the reference above ambient temperature. Other means to heat or cool the stack, well known in the art, may also be employed. For more versatility, thermoelectric heat pumps attached to the back side of the mounting plate and/or each side of the baffle 21 may be used for temperature control below, near, or above ambient temperatures. Cryogenic fluids (e.g. liquid nitrogen) and expanding freon are other choices of heat absorption means used alone or in conjunction with resistive heaters to realize temperature control. The temperature sensor 20 positioned in the middle of the stack of razor blades can be part of a feedback temperature control system that powers means such as heating elements, preferably located on the back side of the mounting plate 17 in any one of a variety of well known manners.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of the appended claims. What is claimed as new and desired to be secured by Letters Patent of the United States is:

1. An infrared radiation reference comprising:
    a plurality of nestable, thin, individual members formed from a high thermally stable material, each of said members including a generally symmetrical, triangular edge, said member forming a parallel array of triangular edges when nested, said edges having highly emissive surfaces with predictable properties;
    means for maintaining said members in a close abutting relationship such that the region between the adjacent members approaches a parallel wall slot of small width thereby forming a light trap;
    means for controlling the temperature of said members; and
    means for sensing the temperature of said members.

2. The infrared radiation reference of claim 1 wherein each of said members are from about 0.0015 to about 0.009 inch thick.

3. The infrared radiation reference of claim 2 wherein each of said members is a razor blade and each of said triangular edges is a cutting edge.

4. The infrared radiation reference of claim 3 wherein each of said cutting edges is oxidized.

5. The infrared radiation reference of claim 4 wherein each of said wedge-shaped cutting edges has an included solid angle which is less than about 14°.

6. The infrared radiation reference of claim 5 wherein each of said triangular cutting edges extend back from the edge for a distance of about 0.1 inch or less.

7. The infrared radiation reference of claim 6 wherein the sides of each of said triangular cutting edges each define a single, substantially planar, uninterrupted, continuous facet.

8. The infrared radiation reference of claim 6 wherein the sides of each of said triangular cutting edges each define a plurality of facets.

9. The infrared radiation reference of claim 8 wherein the facet on each side of and immediately adjacent the ultimate edge of each cutting edge has a width of 0.0003 inch or less.

10. The infrared radiation reference of claim 5 wherein the thickness of each of said cutting edges is generally less than 6000 Angstrom units and preferably less than 2500 Angstrom units.

11. The infrared radiation reference of claim 5 wherein the apex of each of said cutting edges has a radius of curvature of about 50 Angstrom units.

12. The infrared radiation reference of claim 3 wherein each of said razor blades is formed of hardened stainless steel.

13. A portable infrared radiation reference comprising:
    a plurality of nestable, thin, individual members formed from a thermally stable material, each of said members including a generally wedge-shaped edge, said members forming a parallel array of edges when nested, said edges having highly emissive surfaces with predictable properties;
    a mounting means formed of a high thermal conductive material for maintaining said members in a close abutting relationship such that the region between the adjacent members approaches a parallel wall slot of small width thereby forming a light trap;
    means for controlling the temperature of said members; and
    means for sensing the temperature of said members.

14. The infrared radiation reference of claim 13 wherein each of said members is about 0.0015 to 0.009 inch thick and each of said wedge-shaped edges is a generally summetrical-triangular edge.

15. The infrared radiation reference of claim 14 wherein each of said edges is oxidized.

16. The infrared radiation reference of claim 15 wherein said mounting means includes a mounting plate with a coefficient of thermal expansion near that of the coefficient of thermal expansion of said thin members.

17. The infrared radiation reference of claim 16 wherein said mounting plate is formed of copper and said thin members are formed of stainless steel.

18. The infrared radiation reference of claim 17 wherein said thin members are razor blades permanently mounted on said mounting plate.

19. The infrared radiation reference of claim 18 further including a baffle member disposed about a portion of the periphery of said mounting plate for reducing edge gradients and for increasing temperature uniformity of said nestable members.

20. The infrared radiation reference of claim 19 wherein each of said razor blades includes a centrally located aperture and wherein said temperature sensing means is disposed in said aperture.

21. The infrared radiation reference as in claim 19 wherein said nest of razor blades includes a centrally located well and wherein said temperature sensing means is disposed in said well.

22. The infrared radiation reference of claim 20 wherein each of said razor blades includes a plurality of registry aid perforations.

* * * * *